US010341190B2

United States Patent
Narayanam et al.

(10) Patent No.: US 10,341,190 B2
(45) Date of Patent: Jul. 2, 2019

(54) CENTRALITY MEASURE RANKING FOR A MULTIPLEX NETWORK

(71) Applicant: INTERNATIONAL BUSINESS MACHINES CORPORATION, Armonk, NY (US)

(72) Inventors: Krishnasuri Narayanam, Bangalore (IN); Ramasuri Narayanam, Andhra Pradesh (IN); Mukundan Sundararajan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 15/812,633

(22) Filed: Nov. 14, 2017

(65) Prior Publication Data
US 2019/0149422 A1 May 16, 2019

(51) Int. Cl.
*H04L 12/28* (2006.01)
*H04L 12/24* (2006.01)

(52) U.S. Cl.
CPC .................. *H04L 41/12* (2013.01)

(58) Field of Classification Search
CPC ... H04L 67/1097; H04L 67/12; H04L 1/0002; H04L 45/50; H04L 45/22; H04L 45/62; H04L 49/602; H04L 63/20; H04L 41/0663; H04L 12/185; H04L 12/189; H04L 1/00
See application file for complete search history.

(56) References Cited

U.S. PATENT DOCUMENTS

| 7,342,896 | B2 | 3/2008 | Ayyagari | |
|---|---|---|---|---|
| 9,130,875 | B2 | 9/2015 | Mack-Crane | |
| 9,876,865 | B1 * | 1/2018 | Skalecki | H04L 67/16 |
| 2011/0302390 | A1 * | 12/2011 | Copeland | G06F 9/5061 712/2 |
| 2015/0098385 | A1 * | 4/2015 | Navalekar | H04L 1/00 370/312 |
| 2018/0241636 | A1 * | 8/2018 | Zhang | H04L 41/145 |

OTHER PUBLICATIONS

Battiston, F., et al., "Structural Measures for Multiplex Networks" [retrieved on Aug. 18, 2017]. Retrieved from the Internet: < URL: https://journals.aps.org/pre/abstract/10.1103/PhysRevE.89.032804>, Phys. Rev. E 89, 032804. Mar. 12, 2014, 3 pgs.

(Continued)

*Primary Examiner* — Sai Aung
(74) *Attorney, Agent, or Firm* — Michael O'Keefe; Matthew H.. Huilhan; Heslin Rothenberg Farley & Mesiti PC

(57) ABSTRACT

Centrality measure ranking for a multiple network is provided by a method that includes obtaining a representation of a multiplex network including layers and nodes representing communicating entities. The method determines a node centrality measure for each node of the nodes. This includes determining intra-layer and inter-layer centrality measures. The method determines a respective centrality measure for each communicating entity as a function of node centrality measures for nodes representing the communicating entity across the layers of the multiplex network. The method also ranks the communicating entities by their centrality measures.

20 Claims, 8 Drawing Sheets

(56) References Cited

OTHER PUBLICATIONS

Dasgupta, K., et al., "Social Ties and Their Relevance to Churn in Mobile Telecom Networks" [retrieved on Nov. 14, 2017]. Retrieved from the Internet: < URL: file:///C:/Users/spl/Downloads/SNAzzy-Churn-SocialTies-EDBT2008.pdf>, EDBT '08 Proceedings of the 11th International Conference on Extending Database Technology: Advances In Database Technology. Nantes, France, Mar. 25-29, 2008, pp. 668-677.

Halu, A., et al. "Multiplex Pagerank" [retrieved on Aug. 18, 2017]. Retrieved from the Internet: <URL: http://journals.plos.org/plosone/article?id=10.1371/journal.pone.0078293>, Oct. 30, 2013, 12 pgs.

Kivelä, M., et al, "Multilayer Networks" [retrieved on Aug. 18, 2017]. Retrieved from the Internet: < URL: https://academic.oup.com/comnet/article/2/3/203/2841130/Multilayer-networks>, Journal of Complex Networks, vol. 2, Issue 3. Sep. 1, 2014, pp. 203-271.

Kong, X., et al., "Inferring Anchor Links Across Multiple Heterogeneous Social Networks" [retrieved on Aug. 18, 2017]. Retrieved from the Internet: < URL: https://pdfs.semanticscholar.org/6174/5e0a984e8fd9c45f545c3c83f7b99b110505.pdf>, Oct. 27-Nov. 1, 2013, 10 pgs.

Li, X., et al., "HAR: Hub, Authority and Relevance Scores in Multi-Relational Data For Query Search" [retrieved on Aug. 18, 2017]. Retrieved from the Internet: < URL: http://epubs.siam.org/doi/abs/10.1137/1.9781611972825.13>, 2012, 2 pgs.

Liu, L., et al., "Learning Influence From Heterogeneous Social Networks" [retrieved on Aug. 18, 2017]. Retrieved from the Internet: < URL: https://link.springer.com/article/10.1007/s10618-012-0252-3>, May 2, 2011, 2 pgs.

Menichetti, Giulia, et al., "Weighted Multiplex Networks" [retrieved on Aug. 17, 2017]. Retrieved from the Internet: < URL: https://arxiv.org/abs/1312.6720v1>, Dec. 23, 2013, 23 pgs.

Mucha, P.J., et al., "Community Structure in Time-Dependent, Multiscale, And Multiplex Networks" [retrieved on Aug. 17, 2017]. Retrieved from the Internet: < URL: http://science.sciencemag.org/content/328/5980/876>, Science May 14, 2010: vol. 328, Issue 5980, pp. 876-878.

Shi, C., et al., "A Survey of Heterogeneous Information Network Analysis" [retrieved on Aug. 18, 2017]. Retrieved from the Internet: < URL: http://ieeexplore.ieee.org/abstract/document/7536145/ >, IEEE Transactions on Knowledge and Data Engineering, vol. 29, Issue 1, Jan. 1, 2017, 5 pgs.

Socievole, A., et al., "ML-SOR: Message Routing Using Multi-Layer Social Networks in Opportunistic Communications" [retrieved on Aug. 17, 2017]. Retrieved from the Internet: <URL: http://www.sciencedirect.com/science/article/pii/S1389128615000638>, © 2015 Elsevier B.V., 5 pgs.

Solá, L.; et al., "Eigenvector Centrality of Nodes in Multiplex Networks" [retrieved on Aug. 18, 2017]. Retrieved from the Internet: < URL: https://arxiv.org/pdf/1305.7445v2.pdf>, Sep. 4, 2013, 11 pgs.

Zhang, J., et al., "Meta-path Based Multi-Network Collective Link Prediction" [retrieved on Jul. 18, 2017]. Retrieved from the Internet: < URL: https://pdfs.semanticscholar.org/fab3/c14a392c093dbd7e9cc7248c78a63f93064b.pdf>, KDD 14, Aug. 24-27, 2014, 10 pgs.

Zhang, J., et al., "Mutual Community Detection Across Multiple Partially Aligned Social Networks" [retrieved on Aug. 18, 2017]. Retrieved from the Internet: < URL: https://arxiv.org/pdf/1506.05529.pdf>, Jun. 18, 2015, 12 pgs.

Zhang, J., et al., "Predicting Social Links For New Users Across Aligned Heterogeneous Social Networks" [retrieved on Aug. 18, 2017]. Retrieved from the Internet: < URL: https://arxiv.org/pdf/1310.3492.pdf>, Oct. 13, 2013, 11 pgs.

Mell, Peter, et al., "The NIST Definition of Cloud Computing", NIST Special Publication 800-145, Sep. 2011, Gaithersburg, MD, 7 pgs.

\* cited by examiner

CENTRALITY MEASURE RANKING FOR A MULTIPLEX NETWORK

BACKGROUND

Multiplex networks are a type of multilayer network in which a set of entities is represented in each of several layers of the network and different layers have different edge presentations between those entities. Multiplex networks are presented in several real-world scenarios, including heterogeneous contact networks, airline networks, and multi-model transportation networks. Different approaches exist for analyzing multiplex networks. In one approach, nodes and edges are projected into a single layer to form a single graph against which the analysis is performed. In another approach, any analytic of interest, for instance a ranking mechanism, is evaluated on each layer separately and then the results are aggregated in any of various ways. That approach avoids projection and analyzes nodes layer-by-layer. In yet another approach, the analytic is evaluated directly by taking into account the effects of the interdependencies among the layers and keeping the network intact. However, current approaches fail to adequately characterize information-flow centric nodes in multiplex networks and account for the speed of information propagation while performing such characterizing.

SUMMARY

Shortcomings of the prior art are overcome and additional advantages are provided through the provision of a computer-implemented method. The method obtains a digital graphical representation of a multiplex network including a plurality of layers and a plurality of nodes representing communicating entities of the multiplex network. Each layer of the plurality of layers includes a respective node for each communicating entity of the plurality of communicating entities and a respective set of edges, of a plurality of edges of the multiplex network, connecting pairs of nodes of the layer. The method determines a node centrality measure for each node of the plurality of nodes. Determining the node centrality measure include, for each node of the plurality of nodes, determining an intra-layer centrality measure for the node based on presence of the node along one or more shortest paths between pairs of nodes within a same layer of the plurality of layers of the multiplex network. Determining the node centrality measure also includes determining an inter-layer centrality measure for the node based on presence of the node along one or more shortest paths between pairs of nodes within different layers of the plurality of layers of the multiplex network. Determining the node centrality measure also includes determining the node centrality measure for the node as a function of the intra-layer centrality measure for the node and the inter-layer centrality measure for the node. The method also determines a respective centrality measure for each communicating entity, of the communicating entities, as a function of node centrality measures for nodes, of the plurality of nodes, representing the communicating entity across the plurality of layers of the multiplex network. The method ranks the communicating entities by their centrality measures.

Further, a computer system is provided that includes a memory and a processor in communication with the memory, wherein the computer system is configured to perform a method. The method obtains a digital graphical representation of a multiplex network including a plurality of layers and a plurality of nodes representing communicating entities of the multiplex network. Each layer of the plurality of layers includes a respective node for each communicating entity of the plurality of communicating entities and a respective set of edges, of a plurality of edges of the multiplex network, connecting pairs of nodes of the layer. The method determines a node centrality measure for each node of the plurality of nodes. Determining the node centrality measure include, for each node of the plurality of nodes, determining an intra-layer centrality measure for the node based on presence of the node along one or more shortest paths between pairs of nodes within a same layer of the plurality of layers of the multiplex network. Determining the node centrality measure also includes determining an inter-layer centrality measure for the node based on presence of the node along one or more shortest paths between pairs of nodes within different layers of the plurality of layers of the multiplex network. Determining the node centrality measure also includes determining the node centrality measure for the node as a function of the intra-layer centrality measure for the node and the inter-layer centrality measure for the node. The method also determines a respective centrality measure for each communicating entity, of the communicating entities, as a function of node centrality measures for nodes, of the plurality of nodes, representing the communicating entity across the plurality of layers of the multiplex network. The method ranks the communicating entities by their centrality measures.

Yet further, a computer program product including a computer readable storage medium readable by at least one processor and storing instructions for execution by the at least one processor is provided for performing a method. The method obtains a digital graphical representation of a multiplex network including a plurality of layers and a plurality of nodes representing communicating entities of the multiplex network. Each layer of the plurality of layers includes a respective node for each communicating entity of the plurality of communicating entities and a respective set of edges, of a plurality of edges of the multiplex network, connecting pairs of nodes of the layer. The method determines a node centrality measure for each node of the plurality of nodes. Determining the node centrality measure include, for each node of the plurality of nodes, determining an intra-layer centrality measure for the node based on presence of the node along one or more shortest paths between pairs of nodes within a same layer of the plurality of layers of the multiplex network. Determining the node centrality measure also includes determining an inter-layer centrality measure for the node based on presence of the node along one or more shortest paths between pairs of nodes within different layers of the plurality of layers of the multiplex network. Determining the node centrality measure also includes determining the node centrality measure for the node as a function of the intra-layer centrality measure for the node and the inter-layer centrality measure for the node. The method also determines a respective centrality measure for each communicating entity, of the communicating entities, as a function of node centrality measures for nodes, of the plurality of nodes, representing the communicating entity across the plurality of layers of the multiplex network. The method ranks the communicating entities by their centrality measures.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for characterizing information-flow centric nodes (or bridge nodes) in multiplex networks, for instance while accounting for the speed of information propagation.

Figure 1:
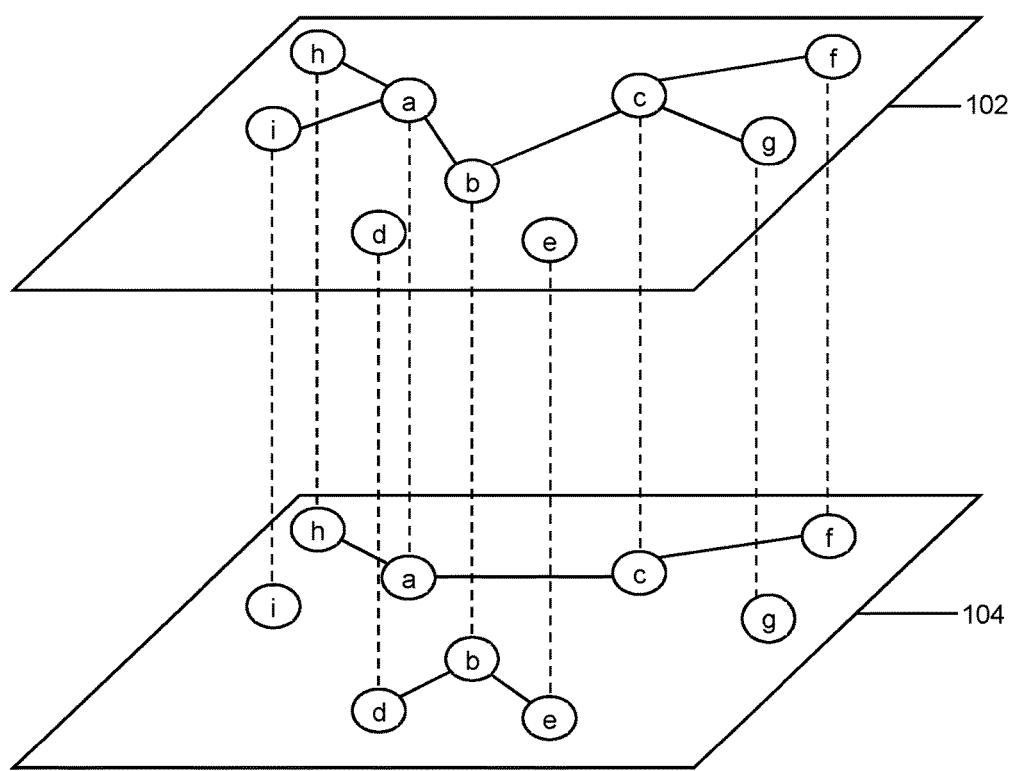
FIG. 1 depicts an example representation of a multiplex network.

FIG. 1 depicts an example representation of a multiplex network. In this basic example, the network includes two layers (102, 104). The network in this example has nine communicating entities labeled 'a' through T. Each layer includes nodes representing each entity. For instance, there are nine nodes in layer 102 representing the nine entities 'a' through T and nine nodes in layer 104 representing entities 'a' through T. The dashed lines in FIG. 1 conceptually link the counterpart nodes for a given entity in different layers. Examples described herein may refer to a group of inter-layer counterpart nodes corresponding to a single entity simply as a 'node' representing that entity across the layers.

The multiplex network can be digitally graphically represented, for instance in a digital format using data structure(s). Accordingly, a computer system can process the digital graphical representation of the multiplex network to achieve aspects described herein.

Layer 102 shows a set of edges connecting various nodes of layer 102. An edge represents a connection between the nodes in that layer, which represents a connection, between the represented entities, in that layer. Edges exist between pairs (a, i), (a, h), (a,b), (b,c), (c,f) and (c,g) in layer 102. Similarly, layer 104 shows a set of edges, different from those of layer 102, connecting various nodes of layer 104. In layer 104, edges exist and show a connection between pairs (a,h), (a,c), (c,f), (b,d) and (b,e). The network shows that entities 'a' and 'c' are not connected directly in layer 102 but are in layer 104. An edge represents some relation between entities in a layer. The relation varies depending on the type of network and the entities involved. In a multi-layer contact network, a layer may represent a social network, the entities may be people in the social network and an edge may represent a friendship, linkage, or other connection between entity accounts in the social network.

In the simple example of FIG. 1, node 'b' is the most information-flow centric node. 'Information flow-centric' refers to a node centrality as described in further detail below. Centrality of a node in a graph refers generally to the level of importance or influence the node has in communications within with network. Node 'b' act as a bridge, for instance between nodes 'a' and 'd'. These two nodes are not connected in either layer, yet node 'b' acts as a bridge to connect nodes 'a' and by way of the edge between 'a' and 'b' in layer 102 and then the edge between 'b' and 'd.' in layer 104. A path exists from 'a' to via node 'b'.

Figure 2:
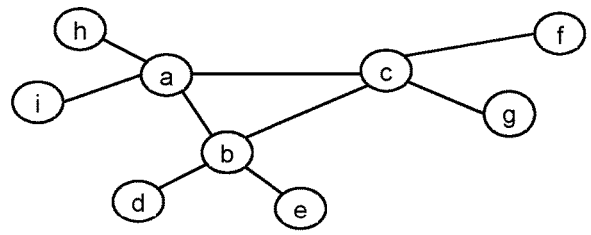
FIG. 2 depicts a flattened representation of the multiplex network of FIG. 1.

FIG. 2 shows a flattened representation of the multiplex network of FIG. 1, in which the edges in each layer are projected onto a single layer. The flattened representation conceptually demonstrates the paths available between nodes in the network, either via a path existing entirely within a layer or via inter-layer bridging by one or more nodes along the path. For instance, a path is shown to exist between nodes 'a' and 'e' by way of bridge node 'b'.

Aspects described herein present a method to determine and rank the time-critical top k-number of information-flow centric nodes in a multiplex network. Time-critical refers to a fewest number of hops, i.e. shortest path. This is achieved by determining a respective centrality measure for each of the communicating entities, the centrality measure being a function of the entity's node centrality measure in each of the layers of the multiplex network.

As noted, multiplex networks have many practical use cases. In one example, a multiplex network models connections in an enterprise setting and is used for efficiently understanding communications flow between entities within the enterprise. For instance, employees of the enterprise have connections with each other using communication channels that include email, instant messaging, and world wide web connections. This scenario of multi-channel communication among employees can be modeled using a multiplex network. The multiplex network can be analyzed to determine an efficient and fastest way for a high-ranking employee to push out a major directive to the others in the enterprise, as an example.

In a similar example, a multiplex network is used to find bridge nodes in social communities. With the advancement and popularity of online social communities, the same individuals interact with each other through various forms of social media, websites, or web-based services. Such scenarios can be conveniently modeled as multiplex networks. Finding the bridge nodes helps identify targets for disseminating the information to all the nodes in the network in a shortest amount of time. This can be important when the task of information dissemination is time-critical. Additionally, viral marketing and other information-spreading campaigns in social networks can leverage multiplex representations of the networks.

In yet another example, multiple networks can be effective for telecommunications analytics. Statistical analysis software, such as the IBM SPSS® predictive analytics line of offerings from International Business Machines Corporation Armonk, N.Y., U.S.A. (of which SPSS is a registered trademark), can predict churn scores of telecommunications customers given (i) a single graph representation of voice call data records, Short Message Service (SMS) call data records or Unstructured Supplementary Service Data (USSD) call data records, or (ii) a single graph (i.e. as a multiplex network) representation of voice, SMS, and USSD call data records together. Finding the top ranked information-flow centric nodes (bridge nodes) in this context can help determine effective communities in the telecommunications call graphs.

Figure 3:
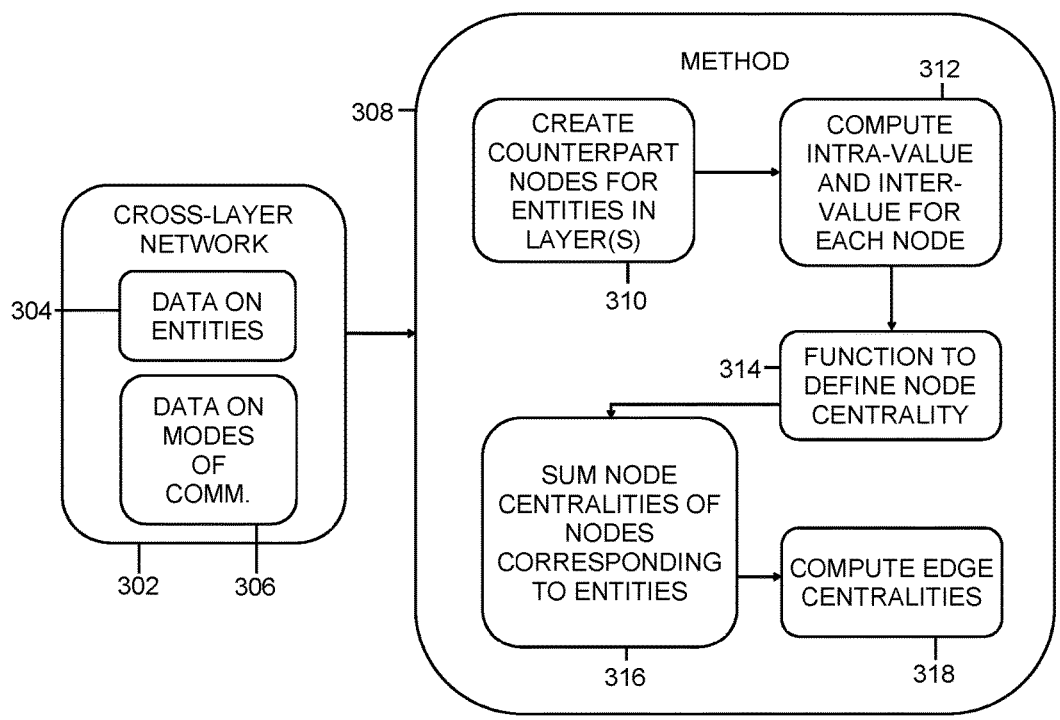
FIG. 3 depicts an example conceptual representation of a process described herein for centrality measure ranking of communicating entities in a multiplex network, in accordance with aspects described herein.

FIG. 3 depicts an example conceptual representation of a process described herein for centrality measure ranking of communicating entities in a multiplex network, in accordance with aspects described herein. In this example, assume there are N entities that interact with each other using L varieties of communication channels. Each communication channel corresponds to a layer l existing in L. The representation of the multiplex or cross-layer network 302 includes data on/about the entities of the network 304 and data on/about the modes of communication 306. This is supplied as input to the process 308. Initially at 310, the process creates counterpart nodes for the entities throughout all layers. There are L different layers in the multiplex network and a replica/copy of each of the N entities, each represented as a node, are made for each layer. If the entity does not have a presence (for instance an account) in a given layer, a counterpart node is created for that entity but it is standalone in that it does not link to any other nodes in that layer. Also at 310, appropriate indexing is done to tag or label the nodes in each layer, which is used to correlate the nodes in each layer that are common to each entity.

The process computes, for each node (i.e. for a given node corresponding to a given entity in a given layer) an intra-value and inter-value for the node, also referred to herein as intra-layer centrality measure and inter-layer centrality measure (312).

The intra-layer centrality measure is a measure of the ability of the node in question to form (shortest) paths between any pair of nodes within a given layer—that is the presence of the node in question along the shortest path(s) between a pair of nodes. 'Shortest' is relative to all paths between the pair of nodes, and the ability of the node in question to 'form the shortest path' refers to whether the node in question is along one or more of the shortest paths between the pair of nodes.

Inter-layer centrality measure is a measure of the ability of the node in question to form (shortest) paths across any pair of nodes belonging to different layers—in other words, the presence of the node in question in shortest path(s) between any nodes 'x' and 'y' that exist in different layers of the multiplex network. Looking at the example of FIG. 1, a-b-e is a shortest path between nodes 'a' end e' in different layers, therefore 'b' forms a shortest path between 'a' and e'. Node 'c' is not able to form a shortest path between nodes 'a' and e' in that example.

Next, a function defines node centrality for each node. Specifically, in some examples, a liner combination of the intra-layer centrality measure and inter-layer centrality measure of a node defines the node centrality measure, or information-flow centric value, of that node. A parameter of the linear combination, a propagation weightage coefficient, captures the speed of information dissemination (in terms of shortest path) within each layer. In particular, for a node i, the propagation weightage coefficient is modeled using the average length of shortest paths between any pair of nodes that pass-through node i. The parameter associated with the linear combination can be learned depending on the context, for instance the intra-layer centrality measure may be given more weight than the inter-layer centrality measure.

The process of FIG. 3 continues by summing, for each entity, the node centrality measures of the nodes corresponding to that entity across the layers (316). In other words, the node centrality measures for a given entity are aggregated across the layers for an overall centrality measure for the entity.

The following equations provide example expressions to compute a node centrality measure and a centrality measure for an entity, in accordance with aspects described herein.

$$l(v^l) = \sum_{\substack{x,y \in V \\ x \neq y}} \left( \gamma \sum_{\alpha \in L_m} \frac{M_{x^\alpha y^\alpha}^{v^l} \sigma_{x^\alpha y^\alpha}^{v^l}}{\sigma_{x^\alpha y^\alpha}} + (1-\gamma) \sum_{\substack{\alpha,\beta \in L_m \\ \alpha \neq \beta}} \frac{M_{x^\alpha y^\beta}^{v^l} \sigma_{x^\alpha y^\beta}^{v^l}}{\sigma_{x^\alpha y^\beta}} \right) \quad \text{(Eq. 1)}$$

$$l(v^*) = \Sigma_{l \in L_m} l(v^l) \quad \text{(Eq. 2)}$$

In the above equations, $v^l$ is a specific node v in layer l, $l(v^l)$ is the node centrality measure for $v^l$, x and y are any two vertices/nodes in the multiplex network, V is the set of nodes of the multiplex network, $L_m$ is the set of layers of the multiplex network, $\alpha$ is an arbitrary layer of the layers of the multiplex network, $\gamma$ is the parameter associated with the linear combination, for instance a weight between 0 and 1, $\sigma_{x^\alpha y^\alpha}$ is a number of shortest paths between nodes $x^\alpha$ (node x in layer $\alpha$) and $y^\alpha$ (node y in layer $\alpha$), $\sigma_{x^\alpha y^\alpha}^{v^l}$ is a number of shortest paths between nodes $x^\alpha$ and $y^\alpha$ that pass through node and $M_{x^\alpha y^\alpha}^{v^l}$ is the average length of shortest paths between nodes $x^\alpha$ and $y^\alpha$ that pass through node $v^l$.

Eq. 1 depicts a linear combination as an addition of the intra-layer connectivity and inter-layer connectivity measure for the node $v^l$. Gamma is a parameter indicating how important the intra-layer connectivity is versus the inter-layer connectivity. A user, such as an administrator, can dictate the gamma term.

Eq. 1 is the expression for computing the centrality measure for node v, for entity n, in layer l. Once the centrality measures for all nodes (v) for entity n in each of the layers l is computed, by Eq. 2 these centrality measures are summed to obtain the overall centrality measure for the entity n. v* of Eq. 2 represents the communicating entity, and l(v*) is this centrality measure of the communicating entity.

As an enhancement, the information-flow centric measure of each edge in the network can be determined using a function of the properties of the respective two nodes that each edge connects, degree of the nodes, and/or other positional values. Referring to FIG. 3, edge centralities for the edges can be computed (318) and used in any of a variety of ways, for instance community detection as described herein.

One Specific method of deriving edge centrality is as follows:

For each edge e=(u, v), $$I(e) = \frac{d(u)I(u) + d(v)I(v)}{(d(u) + d(v))(|c(u,v)| + 1)}, \ e(u,v) \in E \quad \text{(Eq. 3)}$$

where I(e) is the edge centrality measure of edge e, d(i) is degree of node i, I(i) is the node centrality measure of node i, E is the set of edges in the multiplex network, and c(u,v) is the set of common neighbors of u and v.

Accordingly, presented herein is a method based on efficient accumulation techniques that integrates well with traversal algorithms. The method solves one single-source shortest path problem for every vertex.

In an example algorithm, the dependencies of the source on each other vertex are added at the end of each iteration to the centrality score of that vertex.

Below ("Algorithm 1") is one example algorithm for computation of cross-layer betweenness centrality in accordance with aspects described herein.

```
//BEGIN Algorithm 1:
  Computation of Cross-layer Betweenness Centrality
Data: Graph G_m, GAMMA: tuning parameter
Result:
CBC: vector containing betweenness centrality values of all vertices
Initialization:
SP: a 1 × NL matrix storing the shortest-path acyclic graph
SIGMA: A 1 × NL matrix storing the number of shortest paths passing
through each vertex
d: A 1 × NL matrix storing the distance to every node in every layer
CBC: A 1 × N matrix storing betweenness centrality values of all vertices
FOR n in 1...N, DO
  S ← \phi;
  SP ← \phi;
  SIGMA ← 0; SIGMA[w] ← 1, n \equiv w\% N;
  d \gets -1$; $d[w] \gets 0$, n \equiv w\% N;
  d_M[1...NL] ← -1; d M[w] ← 0, $n \equiv w\% N;
  V_{s}[1...N] ← \phi;
  Q ← \phi;
  enqueue n → Q;
  WHILE Q != \phi DO
  {
    dequeue v ← Q;
    push v → S;
    IF v \neq s
    {
      W=neighbors of v in G_m
    }
    ELSE
    {
      W= \bigcup\limits_{\substack{v^{'} \equiv n\% N \\
v^{'}\in \{1...NL\}}} neighbors of v^{'};
    }
    FOR w \in W DO
    {
      IF d[w] < 0 THEN
      {
        enqueue w → Q;
        d[w] ← d[v]+1;
        IF d_M[w\%N] < 0 V d_M[w\%N] == d[w], THEN
        {
          d_M[w\%N]=d[w];
          add w → V_{s}[w\%N];
        }
      }
      IF d[w]==d[v]+1
      {
        SIGMA[w] ← SIGMA[w] + SIGMA[v];
        add v → P[w]
      }
    }
  } %% end of while
  FOR w in {1...N} DO
  {
    SIGMA_M[w] ← 0;
    FOR v in v_{s}[w] DO
      SIGMA_M[w] ← SIGMA_M[w] + SIGMA[v];
  }
  WHILE S not empty, DO
  {
    Pop w ← S;
    FOR v in SP[w] DO
    {
      IF w in V_{s}[w %N] THEN
      {
        DELTA[v] ← DELTA[v] + (1-GAMMA) *
(SIGMA[v]/SIGMA[w]) * [(SIGMA[w] / SIGMA_M[w]) +DELTA[w] ];
      }
      ELSE
      {
        DELTA[v] ← DELTA[v] + GAMMA *
(SIGMA[v]/SIGMA[w]) * DELTA[w];
      }
      IF w not equal to n, THEN
      {
        CBC[w % N] ← CBC[w % N] + DELTA[w];
      }
    }
  }
}
//END Algorithm 1
```

The following Tables 1 and 2 present descriptions of two example multiplex networks used in a simulation:

TABLE 1

Airlines Network

| Layers | # nodes | # edges |
|---|---|---|
| Airline 1 | 59 | 138 |
| Airline 2 | 65 | 132 |
| Airline 3 | 106 | 488 |

TABLE 2

Coauthorship Network

| Layers | # nodes | # edges |
|---|---|---|
| Algorithms | 20,021 | 92,681 |
| AI | 30,028 | 69,229 |

The simulation follows a message spreading example. Starting with a set of source vertices/initiators (i.e. nodes) having a message, at every time step, each node in the system having the message communicates with one node, which does not already have the message, in its neighborhood and transfers the message. The algorithm terminates when all vertices in the system have received the message.

The aspects described herein were applied to select a top k-number (10 in this example) of information-flow centric nodes as the initiators for the message spreading to achieve the task of spreading the message to all nodes in shortest possible time. The Table 3 below presents the timing results of the simulation under three current approaches/strategies: (i) Random, (ii) Degree, and (iii) Aggregated, versus strategy (iv) described herein and referred to as Top-K. It is seen that the Top-K approach outperforms the three current approaches in terms of speed of dissemination of the message.

TABLE 3

Simulation Results

| Network | Strategy | Time steps |
|---|---|---|
| Airlines | Random | 6.66 |
|  | Degree | 6.15 |
|  | Aggregated | 5.65 |
|  | Top-K | 5.26 |
| Coauthorship | Random | 74.52 |
|  | Degree | 68.98 |
|  | Aggregated | 58.62 |
|  | Top-K | 45.26 |

As a further enhancement, community detection is provided to detect communities, i.e. of nodes, in a multiplex network. This relies on the determined edge centralities of the edges of the multiplex network as described above. The method derives the information-flow centric values for the edges (i.e. edge centralities) using the information-flow centric values of nodes (i.e. node centrality measures). Then, the method repeats the following while the graph (graphical representation of the multiplex network) is not empty: (i) remove the edge having the highest edge centrality measure, and (ii) if an isolated group of nodes forms and its edge density is above certain threshold, then announce that group as a community.

In this manner, as one example, the edge centrality measures for the edges of the network are sorted in descending order. The first edge (corresponding to the edge having the highest edge centrality measure) is removed from the graph. If no group of connected nodes is isolated by that removal, the edge having the next highest edge centrality measure is removed from the graph. Once a removal isolates a group of connected nodes, it is declared a community if the edge density of that group is higher than a threshold, which may be set by a user. If a group is declared a community, the nodes and edges of the group are ignored for the rest of the processing, as if they are removed from the graph. This removal and community declaration repeats until the graph is considered empty (all groups have been isolated) and no more edges exist.

Below ("Algorithm 2") is one example algorithm for community detection in accordance with aspects described herein.

```
//BEGIN Algorithm 2:
Data: Graph G(V,E),   DELTA= density threshold,
Result: List of Communities
G^*: A clone of graph G;
Calculate C_B(v), for each v in V;
WHILE G NOT Empty, DO
{
   Calculate C_B(e), for each e in E;
   topE ← The edge with the highest C_B;
   Remove topE;
   IF there is a new isolated module s, then,
   {
      IF Density(s, G^*) > DELTA, then
      {
         Comm.add(s);
         G.remove(s);
      }
   }
}
Return Comm;
//END Algorithm 2:
```

Modularity is the measure commonly used to calculate the density of communities. In some examples, aspects described herein achieved about 35% improvement in the density of communities found in the airlines network, and achieved a 54% improvement in the density of communities found in the coauthorship network, as compared to other approaches. That is, a 35% (or 54%) better modularity score was attained as compared to the other approaches.

Notably, the proposed construct of the node centrality measure and centrality measure for an entity improves the identification of more cohesive communities in multiplex networks.

In accordance with aspects described herein, a method is provided to determine the top k-number of information-flow centric nodes in a multiplex network by defining the information-flow centric value of a node in the multiplex network to be a linear combination of two values associated with that node, namely an intra-layer centrality measure and an inter-layer centrality measure. The intra-layer centrality measure of a node is its ability to form (shortest) paths between any pair of nodes within a layer. The inter-layer centrality measure of a node is its ability to form (shortest) paths across any pair of nodes belonging to different layers.

The proposed information-flow centric value of each node can take into account the speed of information dissemination within each layer by defining propagation weightage coefficient such that, for a node i, it is the average length of shortest paths between any pair of nodes that pass-through node i in a given layer.

Presented is a computationally efficient (therefore power-efficient and consequently less expensive) method to calculate the information-flow centric values of nodes, providing a ranking of the nodes that provide greatest efficiency (therefore power-efficient and consequently less expensive) for distributing information between nodes of the multiplex network. A parameter associated with the linear combination can be learned, perhaps over time, by considering the semantics of the underlying domain and the problem context. A multiplex network of airlines may use a gamma value much less than the gamma value for social networks, for example. Over time, different gamma values can be validated/invalidated and used to refine the gamma values most fitting of different domains.

Figure 4A:
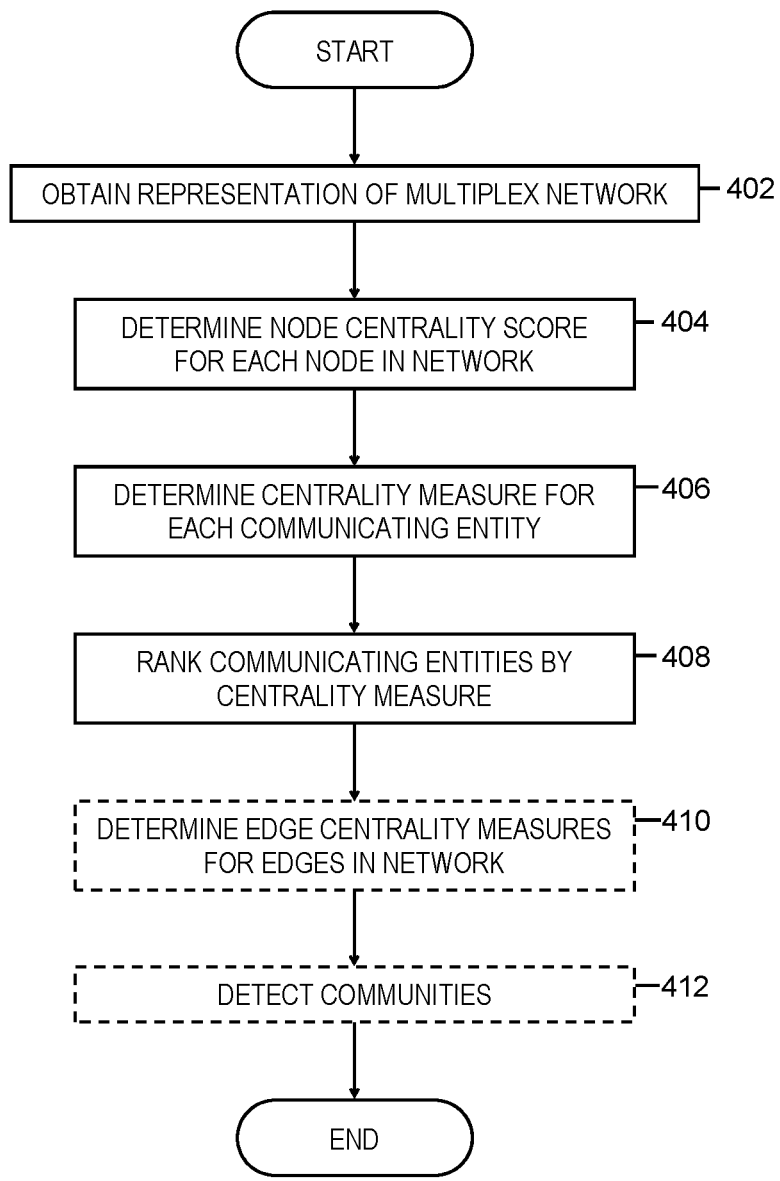
FIG. 4A depicts an example process for centrality measure ranking of communicating entities in a multiplex network, in accordance with aspects described herein.

FIG. 4A depicts an example process for centrality measure ranking of communicating entities in a multiplex network, in accordance with aspects described herein. In some examples, the process is performed by one or more computer systems, such as those described herein.

Figure 4B:
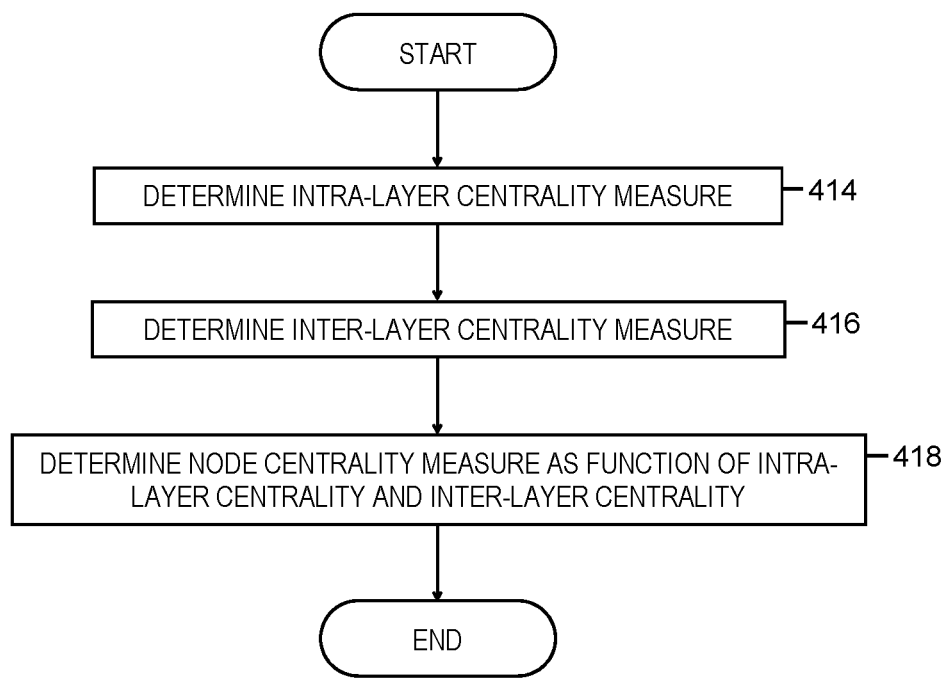
FIG. 4B depicts an example process for determining a node centrality measure, in accordance with aspects described herein.

The process begins by obtaining a digital graphical representation of a multiplex network (402). The multiplex network includes a plurality of layers and a plurality of nodes representing communicating entities of the multiplex network. The communicating entities are N distinct entities that may be communicating in the network. Each layer of the plurality of layers includes a respective node for each communicating entity of the plurality of communicating entities and a respective set of edges, of a plurality of edges of the multiplex network, connecting pairs of nodes of the layer The method determines a node centrality measure for each node of the plurality of nodes (404). The node centrality measure is a measure of the information-flow centricity for a given node in a given layer. FIG. 4B depicts an example process for determining a node centrality measure in accordance with aspects described herein.

Continuing with FIG. 4A, with all of the node centrality measures for each communicating entity (i.e. a measure for each of the entity's nodes in each layer of the network), the process determines a respective centrality measure for each communicating entity of the communicating entities (406). The centrality measure for an entity can be a function of node centrality measures for nodes, of the plurality of nodes, representing that communicating entity across the plurality of layers of the multiplex network. In some examples, the function of the node centrality measures for the nodes representing the communicating entity includes a sum of those node centrality measures.

Figure 4C:
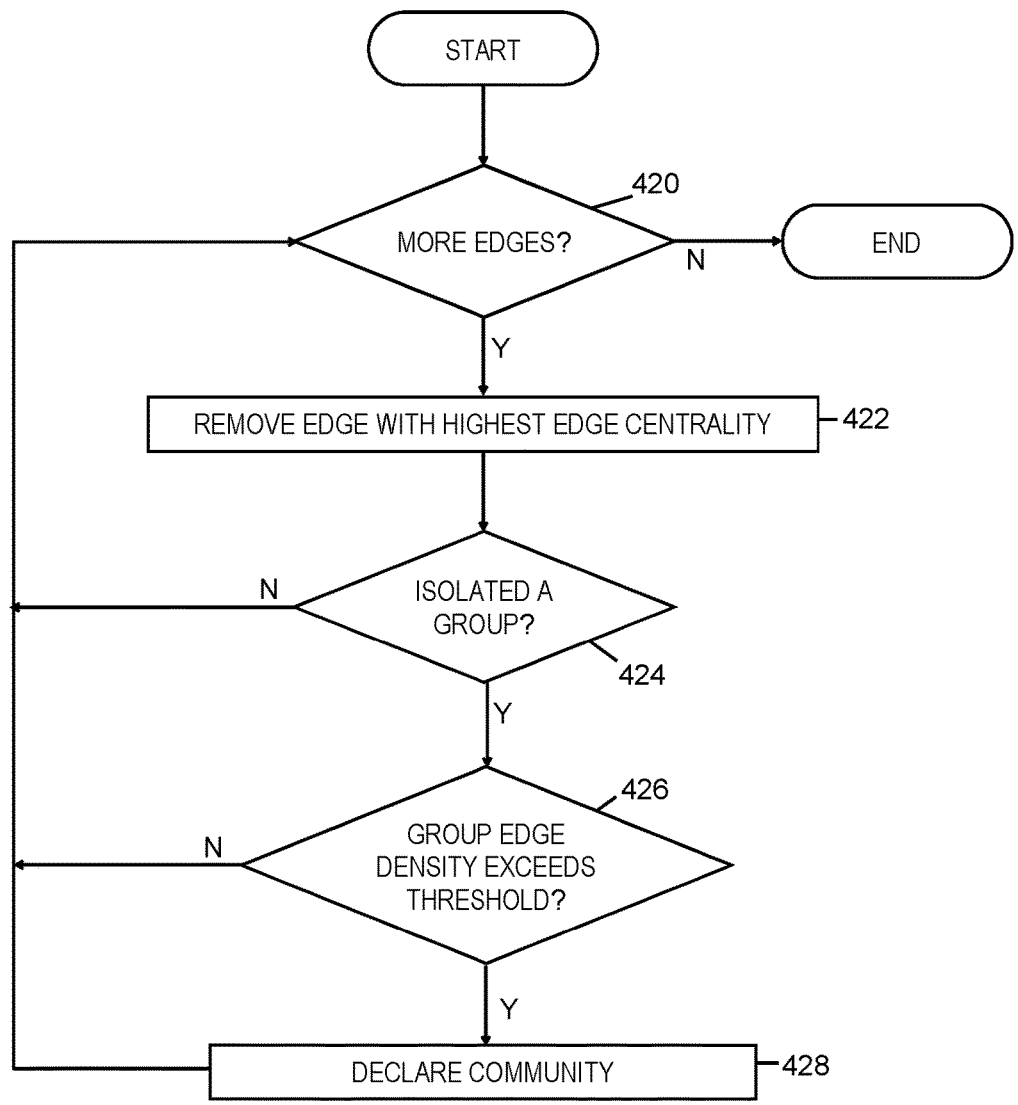
FIG. 4C depicts an example process for community detection in accordance with aspects described herein.

The process of FIG. 4A continues by ranking the communicating entities by their centrality measures (408). In this example process, optional aspects are also performed. For instance, the process determines an edge centrality measure for each edge of the plurality of edges (of the network) based on the determined node centrality measures of two nodes, of the plurality of nodes, between which the edge extends (410). Edge centrality measure can be used in a variety of ways. In this example, the process proceeds by detecting communities in the multiplex network (412), and example process for which is depicted in FIG. 4C.

FIG. 4B depicts an example process for determining node centrality measure for a node, in accordance with aspects described herein. The process is performed by a computer system as an example. The process begins by determining an intra-layer centrality measure for the node (414) based on presence of the node along one or more shortest paths between pairs of nodes within a same layer of the plurality of layers of the multiplex network. The process also determines an inter-layer centrality measure for the node (416) based on presence of the node along one or more shortest paths between pairs of nodes within different layers of the plurality of layers of the multiplex network. The intra-layer and inter-layer centrality measures are then used to determine the node centrality measure for the node (418) as a function of the intra-layer centrality measure for the node and the inter-layer centrality measure for the node.

The function of the intra-layer centrality measure and the inter-layer centrality measure used in determining the node centrality measure for the node may be based on an average length of shortest paths, that pass through the node, between pairs of nodes within a same layer of the plurality of layers. Additionally or alternatively, the function can include a linear combination of the intra-layer centrality measure for the node and the inter-layer centrality measure for the node. Such a linear combination may be a weighted linear combination defining a weight of the intra-layer centrality measure relative to the inter-layer centrality measure.

In particular examples, the node centrality measure for a node of the plurality of nodes is defined as presented in Eq. 1 above and the centrality measure of a communicating entity of the communicating entities may be defined as presented in Eq. 2 above.

FIG. 4C depicts an example process for community detection in accordance with aspects described herein. The method is performed by a computer system, as an example. The method presents an iterative algorithm in which, as long as one or more edges to process remains (420, Y), the process removes from the digital graphical representation of the multiplex network the edge, of the plurality of edges, that has a highest value of edge centrality (422). The process then determines whether the removing produces an isolated group of nodes (424). If so, the process proceeds by checking whether the edge density of that group exceeds a threshold (426). Based on determining that the removing does result in an isolated group of nodes (424, Y) with an edge density exceeding the threshold (426, Y), the isolated group is declared a community (428). In some examples, this group, including the nodes and the edges connecting among each other, is removed from the representation of the multiplex network, or at least no longer considered in the rest of the processing of FIG. 4C.

After declaring the isolated group a community, or if at 424 is it determined that no isolated group resulted from removal of that edge (424, N), or if at 426 it is determined that the group edge density does not exceed the threshold (426, N), then the process returns to 420 to determine whether there are remaining edges in the representation of the multiplex network. If so, the process iterates, otherwise the process ends.

Although various examples are provided, variations are possible without departing from a spirit of the claimed aspects.

Figure 5:
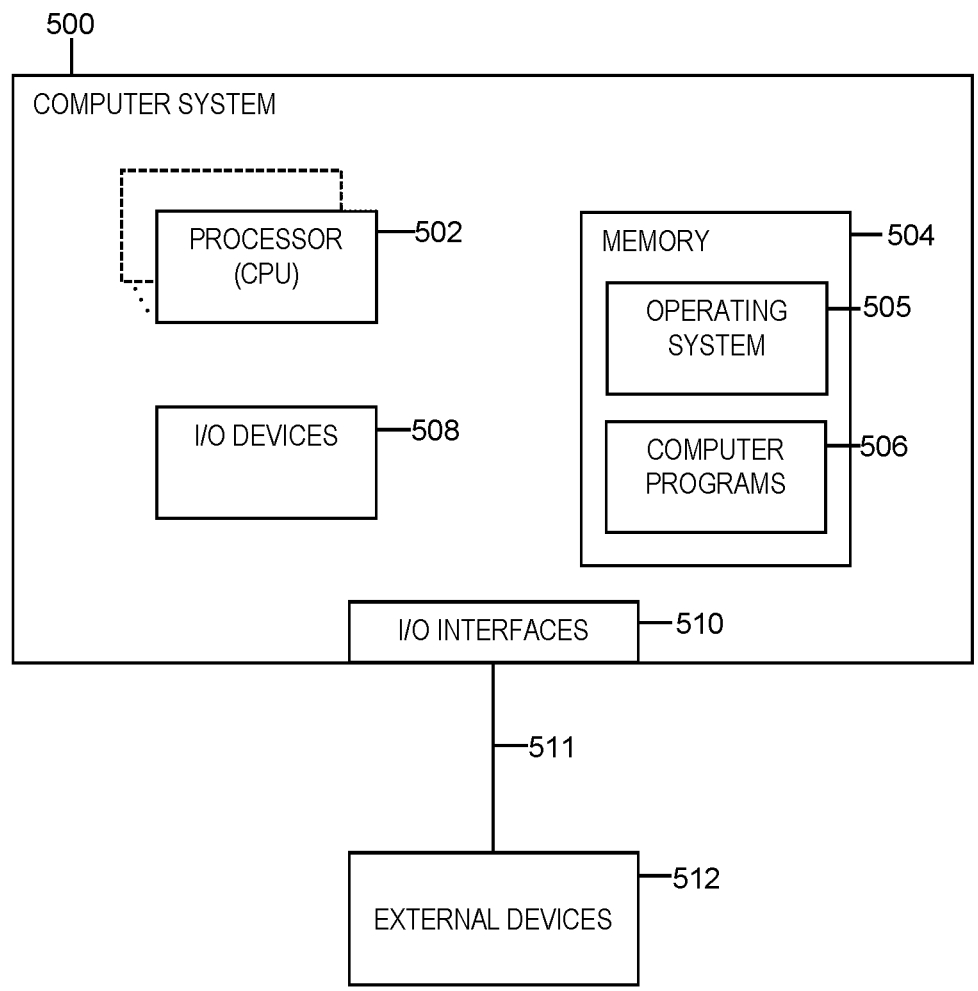
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/ node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive (s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces

510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
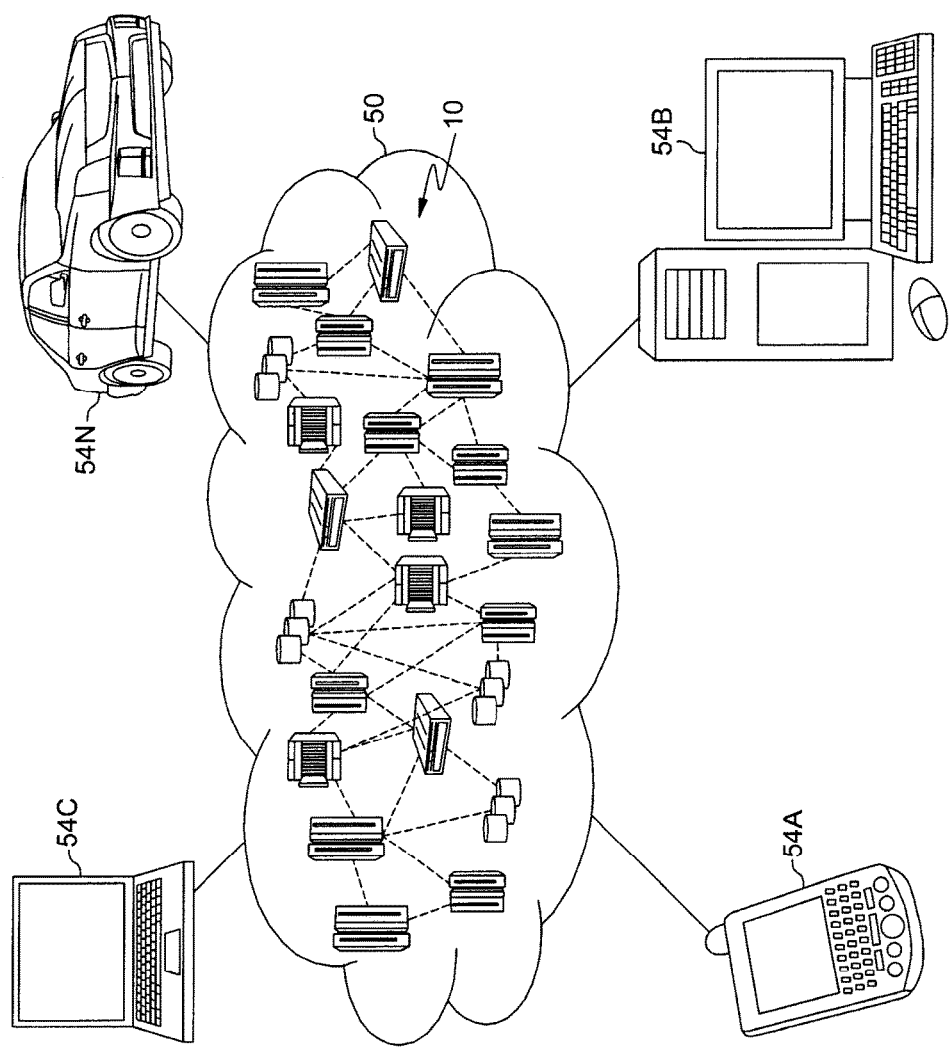
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
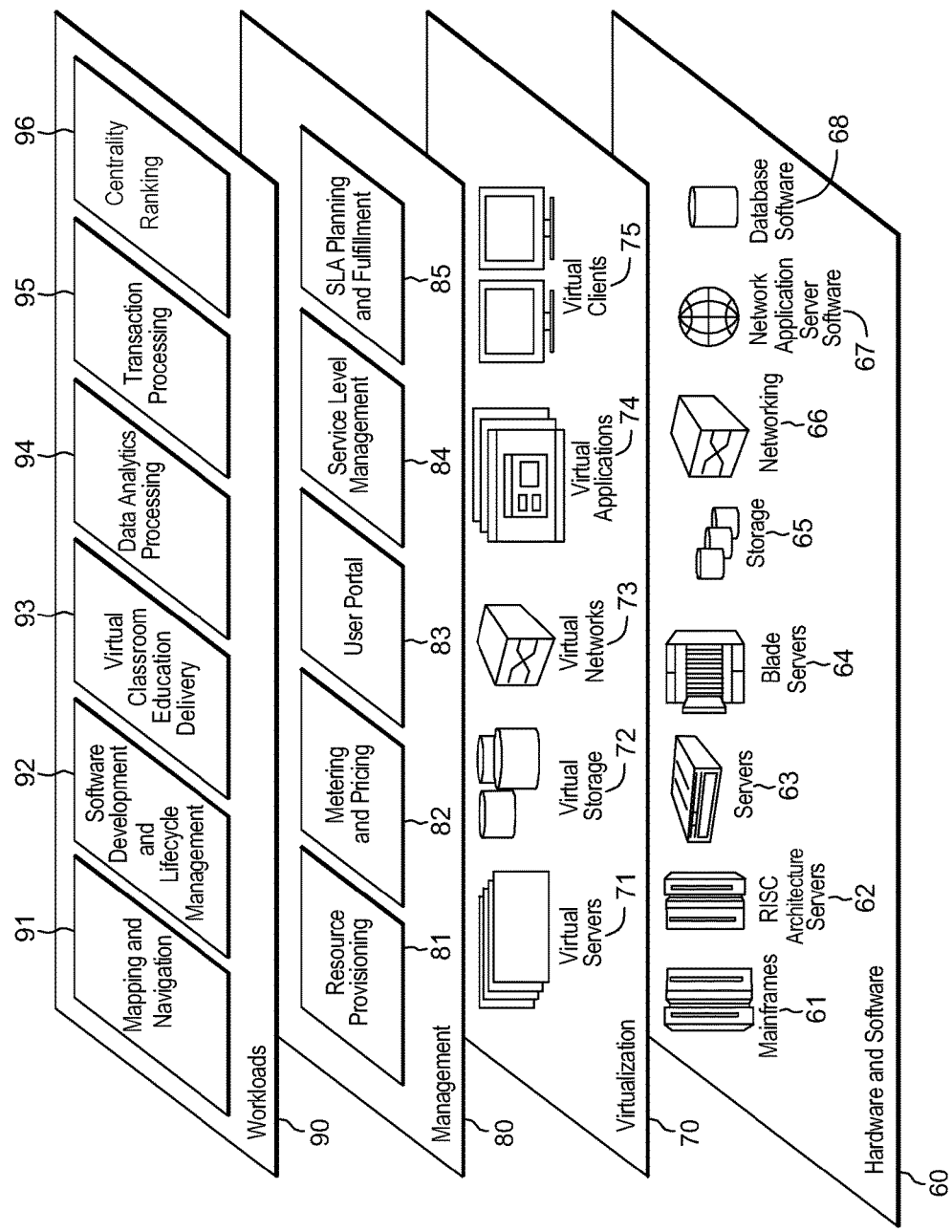
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and centrality ranking 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a digital graphical representation of a multiplex network comprising a plurality of layers and a plurality of nodes representing communicating entities of the multiplex network, wherein each layer of the plurality of layers comprises a respective node for each communicating entity of the plurality of communicating entities and a respective set of edges, of a plurality of edges of the multiplex network, connecting pairs of nodes of the layer;
   determining a node centrality measure for each node of the plurality of nodes, comprising, for each node of the plurality of nodes:
      determining an intra-layer centrality measure for the node based on presence of the node along one or more shortest paths between pairs of nodes within a same layer of the plurality of layers of the multiplex network;
      determining an inter-layer centrality measure for the node based on presence of the node along one or more shortest paths between pairs of nodes within different layers of the plurality of layers of the multiplex network; and
      determining the node centrality measure for the node as a function of the intra-layer centrality measure for the node and the inter-layer centrality measure for the node;
   determining a respective centrality measure for each communicating entity, of the communicating entities, as a function of node centrality measures for nodes, of the plurality of nodes, representing the communicating entity across the plurality of layers of the multiplex network; and
   ranking the communicating entities by their centrality measures.

2. The method of claim 1, wherein the function of the intra-layer centrality measure and the inter-layer centrality measure in determining the node centrality measure for the node is based on an average length of shortest paths, that pass through the node, between pairs of nodes within a same layer of the plurality of layers.

3. The method of claim 1, wherein the function of the intra-layer centrality measure and the inter-layer centrality measure in determining the node centrality measure for the node comprises a linear combination of the intra-layer centrality measure for the node and the inter-layer centrality measure for the node.

4. The method of claim 3, wherein the linear combination is a weighted linear combination defining a weight of the intra-layer centrality measure relative to the inter-layer centrality measure.

5. The method of claim 1, wherein the function of node centrality measures for the nodes representing the communicating entity comprises a sum of the node centrality measures.

6. The method of claim 1, wherein the node centrality measure for a node of the plurality of nodes is defined as:

$$l(v^l) = \sum_{\substack{x,y \in V \\ x \neq y}} \left( \gamma \sum_{\alpha \in L_m} \frac{M_{x^\alpha y^\alpha}^{v^l} \sigma_{x^\alpha y^\alpha}^{v^l}}{\sigma_{x^\alpha y^\alpha}} + (1-\gamma) \sum_{\substack{\alpha,\beta \in L_m \\ \alpha \neq \beta}} \frac{M_{x^\alpha y^\beta}^{v^l} \sigma_{x^\alpha y^\beta}^{v^l}}{\sigma_{x^\alpha y^\beta}} \right)$$

wherein $v^l$ is node v in layer l, $l(v^l)$ is the node centrality measure for $v^l$, x and y are any pair of nodes in the multiplex network, V is the set of the plurality of nodes of the multiplex network, $L_m$ is the set of the plurality of layers of the multiplex network, α is a layer of the plurality of layers of the multiplex network, γ is a weight between 0 and 1, $\sigma_{x^\alpha y^\alpha}$ is a number of shortest paths between nodes $x^\alpha$ (node x in layer α) and $y^\alpha$ (node y in layer α), $\sigma_{x^\alpha y^\alpha}^{v^l}$ is a number of shortest paths between nodes $x^\alpha$ and $y^\alpha$ that pass through node $v^l$, and $M_{x^\alpha y^\alpha}^{v^l}$ is an average length of shortest paths between nodes $x^\alpha$ and $y^\alpha$ that pass through node $v^l$.

7. The method of claim 6, wherein the centrality measure of a communicating entity of the communicating entities is defined as:

$$l(v^*) = \sum_{l \in L_m} l(v^l)$$

wherein $v^*$ represents the communicating entity, and $l(v^*)$ is the centrality measure of the communicating entity.

8. The method of claim 1, further comprising determining an edge centrality measure for each edge of the plurality of edges based on the determined node centrality measures of two nodes, of the plurality of nodes, between which the edge extends.

9. The method of claim 8, further comprising detecting communities in the multiplex network, the detecting comprising iteratively performing:
   removing from the digital graphical representation of the multiplex network an edge of the plurality of edges that has a highest value of edge centrality;
   determining whether the removing results in an isolated group of nodes with an edge density exceeding a threshold; and
   based on determining that the removing does result in an isolated group of nodes with an edge density exceeding the threshold, indicating the isolated group of nodes as a community and removing the isolated group of nodes and connecting edges from the digital graphical representation of the multiplex network.

10. A computer system comprising:
   a memory; and
   a processor in communication with the memory, wherein the computer system is configured to perform a method comprising:
      obtaining a digital graphical representation of a multiplex network comprising a plurality of layers and a plurality of nodes representing communicating entities of the multiplex network, wherein each layer of the plurality of layers comprises a respective node for each communicating entity of the plurality of communicating entities and a respective set of edges, of a plurality of edges of the multiplex network, connecting pairs of nodes of the layer;

determining a node centrality measure for each node of the plurality of nodes, comprising, for each node of the plurality of nodes:

determining an intra-layer centrality measure for the node based on presence of the node along one or more shortest paths between pairs of nodes within a same layer of the plurality of layers of the multiplex network;

determining an inter-layer centrality measure for the node based on presence of the node along one or more shortest paths between pairs of nodes within different layers of the plurality of layers of the multiplex network; and determining the node centrality measure for the node as a function of the intra-layer centrality measure for the node and the inter-layer centrality measure for the node;

determining a respective centrality measure for each communicating entity, of the communicating entities, as a function of node centrality measures for nodes, of the plurality of nodes, representing the communicating entity across the plurality of layers of the multiplex network; and ranking the communicating entities by their centrality measures.

11. The computer system of claim 10, wherein the function of the intra-layer centrality measure and the inter-layer centrality measure in determining the node centrality measure for the node is based on an average length of shortest paths, that pass through the node, between pairs of nodes within a same layer of the plurality of layers.

12. The computer system of claim 10, wherein the function of the intra-layer centrality measure and the inter-layer centrality measure in determining the node centrality measure for the node comprises a linear combination of the intra-layer centrality measure for the node and the inter-layer centrality measure for the node, and wherein the linear combination is a weighted linear combination defining a weight of the intra-layer centrality measure relative to the inter-layer centrality measure.

13. The computer system of claim 10, wherein the node centrality measure for a node of the plurality of nodes is defined as:

$$l(v^l) = \sum_{\substack{x,y \in V \\ x \neq y}} \left( \gamma \sum_{\alpha \in L_m} \frac{M_{x^\alpha y^\alpha}^{v^l} \sigma_{x^\alpha y^\alpha}^{v^l}}{\sigma_{x^\alpha y^\alpha}} + (1-\gamma) \sum_{\substack{\alpha,\beta \in L_m \\ \alpha \neq \beta}} \frac{M_{x^\alpha y^\alpha}^{v^l} \sigma_{x^\alpha y^\beta}^{v^l}}{\sigma_{x^\alpha y^\beta}} \right)$$

wherein $v^l$ is node v in layer l, $l(v^l)$ is the node centrality measure for $v^l$, x and y are any pair of nodes in the multiplex network, V is the set of the plurality of nodes of the multiplex network, $L_m$ is the set of the plurality of layers of the multiplex network, $\alpha$ is a layer of the plurality of layers of the multiplex network, $\gamma$ is a weight between 0 and 1, $\sigma_{x^\alpha y^\alpha}^{v^l}$ is a number of shortest paths between nodes $x^\alpha$ (node x in layer $\alpha$) and $y^\alpha$ (node y in layer $\alpha$), $\sigma_{x^\alpha y^\alpha}$ is a number of shortest paths between nodes $x^\alpha$ and $y^\alpha$ that pass through node $v^l$, and $M_{x^\alpha y^\alpha}^{v^l}$ is an average length of shortest paths between nodes $x^\alpha$ and $y^\alpha$ that pass through node $v^l$.

14. The computer system of claim 13, wherein the centrality measure of a communicating entity of the communicating entities is defined as:

$$l(v^*) = \sum_{l \in L_m} l(v^l)$$

wherein $v^*$ represents the communicating entity, and $l(v^*)$ is the centrality measure of the communicating entity.

15. The computer system of claim 10, wherein the method further comprises:

determining an edge centrality measure for each edge of the plurality of edges based on the determined node centrality measures of two nodes, of the plurality of nodes, between which the edge extends; and detecting communities in the multiplex network, the detecting comprising iteratively performing:

removing from the digital graphical representation of the multiplex network an edge of the plurality of edges that has a highest value of edge centrality;

determining whether the removing results in an isolated group of nodes with an edge density exceeding a threshold; and based on determining that the removing does result in an isolated group of nodes with an edge density exceeding the threshold, indicating the isolated group of nodes as a community and removing the isolated group of nodes and connecting edges from the digital graphical representation of the multiplex network.

16. A computer program product comprising:

a computer readable storage medium readable by at least one processor and storing instructions for execution by the at least one processor for performing a method comprising:

obtaining a digital graphical representation of a multiplex network comprising a plurality of layers and a plurality of nodes representing communicating entities of the multiplex network, wherein each layer of the plurality of layers comprises a respective node for each communicating entity of the plurality of communicating entities and a respective set of edges, of a plurality of edges of the multiplex network, connecting pairs of nodes of the layer;

determining a node centrality measure for each node of the plurality of nodes, comprising, for each node of the plurality of nodes:

determining an intra-layer centrality measure for the node based on presence of the node along one or more shortest paths between pairs of nodes within a same layer of the plurality of layers of the multiplex network;

determining an inter-layer centrality measure for the node based on presence of the node along one or more shortest paths between pairs of nodes within different layers of the plurality of layers of the multiplex network; and determining the node centrality measure for the node as a function of the intra-layer centrality measure for the node and the inter-layer centrality measure for the node;

determining a respective centrality measure for each communicating entity, of the communicating entities, as a function of node centrality measures for nodes, of the plurality of nodes, representing the communicating entity across the plurality of layers of the multiplex network; and ranking the communicating entities by their centrality measures.

17. The computer program product of claim 16, wherein the function of the intra-layer centrality measure and the inter-layer centrality measure in determining the node centrality measure for the node is based on an average length of shortest paths, that pass through the node, between pairs of nodes within a same layer of the plurality of layers.

18. The computer program product of claim 16, wherein the function of the intra-layer centrality measure and the inter-layer centrality measure in determining the node centrality measure for the node comprises a linear combination of the intra-layer centrality measure for the node and the inter-layer centrality measure for the node, and wherein the linear combination is a weighted linear combination defining a weight of the intra-layer centrality measure relative to the inter-layer centrality measure.

19. The computer program product of claim 16, wherein the node centrality measure for a node of the plurality of nodes is defined as:

$$l(v^l) = \sum_{\substack{x,y \in V \\ x \neq y}} \left( \gamma \sum_{\alpha \in L_m} \frac{M_{x^\alpha y^\alpha}^{v^l} \sigma_{x^\alpha y^\alpha}^{v^l}}{\sigma_{x^\alpha y^\alpha}} + (1-\gamma) \sum_{\substack{\alpha,\beta \in L_m \\ \alpha \neq \beta}} \frac{M_{x^\alpha y^\alpha}^{v^l} \sigma_{x^\alpha y^\beta}^{v^l}}{\sigma_{x^\alpha y^\beta}} \right)$$

wherein $v^l$ is node v in layer l, $l(v^l)$ is the node centrality measure for $v^l$, x and y are any pair of nodes in the multiplex network, V is the set of the plurality of nodes of the multiplex network, $L_m$ is the set of the plurality of layers of the multiplex network, $\alpha$ is a layer of the plurality of layers of the multiplex network, $\gamma$ is a weight between 0 and 1, $\sigma_{x^\alpha y^\alpha}^{v^l}$ is a number of shortest paths between nodes $x^\alpha$ (node x in layer $\alpha$) and $y^\alpha$ (node y in layer $\alpha$), $\sigma_{x^\alpha y^\alpha}^{v^l}$ is a number of shortest paths between nodes $x^\alpha$ and $y^\alpha$ that pass through node $v^l$, and $M_{x^\alpha y^\alpha}^{v^l}$ is an average length of shortest paths between nodes $x^\alpha$ and $y^\alpha$ that pass through node $v^l$.

20. The computer program product of claim 19, wherein the centrality measure of a communicating entity of the communicating entities is defined as:

$$l(v^*) = \sum_{l \in L_m} l(v^l)$$

wherein $v^*$ represents the communicating entity, and $l(v^*)$ is the centrality measure of the communicating entity.

\* \* \* \* \*